(12) United States Patent
Ueno

(10) Patent No.: US 11,971,667 B2
(45) Date of Patent: Apr. 30, 2024

(54) LIGHT GUIDE DEVICE, DRUM UNIT, IMAGE FORMING APPARATUS AND IMAGE READING DEVICE INCLUDING LIGHT GUIDE DEVICE

(71) Applicant: KYOCERA Document Solutions Inc., Osaka (JP)

(72) Inventor: Masahiro Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 363 days.

(21) Appl. No.: 17/376,797

(22) Filed: Jul. 15, 2021

(65) Prior Publication Data
US 2022/0026827 A1    Jan. 27, 2022

(30) Foreign Application Priority Data

Jul. 27, 2020 (JP) ................................. 2020-126513

(51) Int. Cl.
  *G03G 15/04* (2006.01)
  *G03B 15/00* (2021.01)
  *G03G 13/04* (2006.01)
(52) U.S. Cl.
  CPC ....... *G03G 15/04036* (2013.01); *G03B 15/00* (2013.01); *G03G 13/04* (2013.01)
(58) Field of Classification Search
  CPC .......................... G03G 15/04036; G03G 13/04
  See application file for complete search history.

(56) References Cited

U.S. PATENT DOCUMENTS

2015/0277359 A1* 10/2015 Abe .................. G03G 21/1817
  399/128
2020/0278638 A1*  9/2020 Takezawa ........ G03G 15/04036

FOREIGN PATENT DOCUMENTS

JP         2019069529 A      5/2019

* cited by examiner

*Primary Examiner* — Minh Q Phan
(74) *Attorney, Agent, or Firm* — Alleman Hall & Tuttle LLP

(57) ABSTRACT

A light guide device includes: a housing main body; a side member attached to a side portion in the housing main body; a light guide body supported by the housing main body and including a light incident surface to which light enters; a light source substrate held by the side member and including a light element that emits the light toward the light incident surface; and a positioning portion configured to position the light element to a reference position with respect to the light incident surface. The positioning portion includes: an abutting member provided in the housing main body and configured to abut on a mounting surface in the light source substrate on which the light element is mounted; and an elastic member held by the side member and configured to press the light source substrate toward the light guide body to position the light element to the reference position.

7 Claims, 8 Drawing Sheets

LIGHT GUIDE DEVICE, DRUM UNIT, IMAGE FORMING APPARATUS AND IMAGE READING DEVICE INCLUDING LIGHT GUIDE DEVICE

INCORPORATION BY REFERENCE

This application is based upon and claims the benefit of priority from the corresponding Japanese Patent Application No. 2020-126513 filed on Jul. 27, 2020, the entire contents of which are incorporated herein by reference.

BACKGROUND

The present disclosure relates to a light guide device including a light guide body configured to guide light from a light source.

In an electrophotographic image forming apparatus, a laser beam is irradiated on a uniformly charged surface of a photoconductor drum so that an electrostatic latent image is formed on the surface of the photoconductor drum. The electrostatic latent image on the photoconductor drum is developed by a developing device using toner. A toner image thus formed on the photoconductor drum is transferred to a transfer target member such as a sheet or an intermediate transfer belt. Subsequently, a charge removing portion irradiates a charge removing light to remove the charge on the surface of the photoconductor drum, and a cleaning portion cleans the surface of the photoconductor drum.

There is known a charge removing portion including a light source substrate and a light guide body, wherein the light source substrate includes a light element, and the light guide body guides light emitted from the light element to the photoconductor drum.

In addition, there is known a configuration where, in an exposure device including a substrate that includes a light element, and an optical system that converges light from the light element, a pressing member presses the substrate to restrict the position of the substrate.

SUMMARY

A light guide device according to an aspect of the present disclosure includes a housing main body, a side member, a light guide body, a light source substrate, and a positioning portion. The side member is attached to a predetermined side portion in the housing main body. The light guide body is supported by the housing main body and includes a light incident surface to which light enters. The light source substrate is held by the side member and includes a light element that emits the light toward the light incident surface. The positioning portion positions the light element to a reference position with respect to the light incident surface. The positioning portion includes an abutting member and an elastic member. The abutting member is provided in the housing main body and configured to abut on a mounting surface in the light source substrate on which the light element is mounted. The elastic member is held by the side member and configured to press the light source substrate toward the light guide body to position the light element to the reference position.

A drum unit according to another aspect of the present disclosure is attached to an image forming apparatus for use. The drum unit includes a housing main body, a side member, a light guide body, a light source substrate, and a positioning portion. The housing main body supports a photoconductor drum rotatably. The side member is attached to a predetermined side portion in the housing main body. The light guide body is supported by the housing main body and includes a light incident surface and a light exit surface. Light enters the light incident surface. The light exit surface emits light in a direction that crosses a direction in which the light enters the light incident surface. The light guide body irradiates a charge removing light from the light exit surface toward the photoconductor drum. The light source substrate is held by the side member and includes a light element that emits the light toward the light incident surface. The positioning portion positions the light element to a reference position with respect to the light incident surface. The positioning portion includes an abutting member and an elastic member. The abutting member is provided in the housing main body and configured to abut on a mounting surface in the light source substrate on which the light element is mounted. The elastic member is held by the side member and configured to press the light source substrate toward the light guide body to position the light element to the reference position.

An image forming apparatus according to still another aspect of the present disclosure includes the drum unit and forms a toner image on the photoconductor drum.

An image forming apparatus according to a further aspect of the present disclosure includes the light guide device and a photoconductor drum to which light guided by the light guide device is irradiated.

An image reading device according to a still further aspect of the present disclosure includes the light guide device and an irradiation target object to which light guided by the light guide device is irradiated. The image reading device reads image data from a surface of the irradiation target object to which the light is irradiated, based on light reflected from the irradiation target object.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure. It is noted that in the following description, an up-down direction D1, a front-rear direction D2, and a left-right direction D3 may be used, wherein the directions are defined on the basis of a state (the state shown in FIG. 1) where an image forming apparatus 10 is installed in a usable manner.

Figure 1:
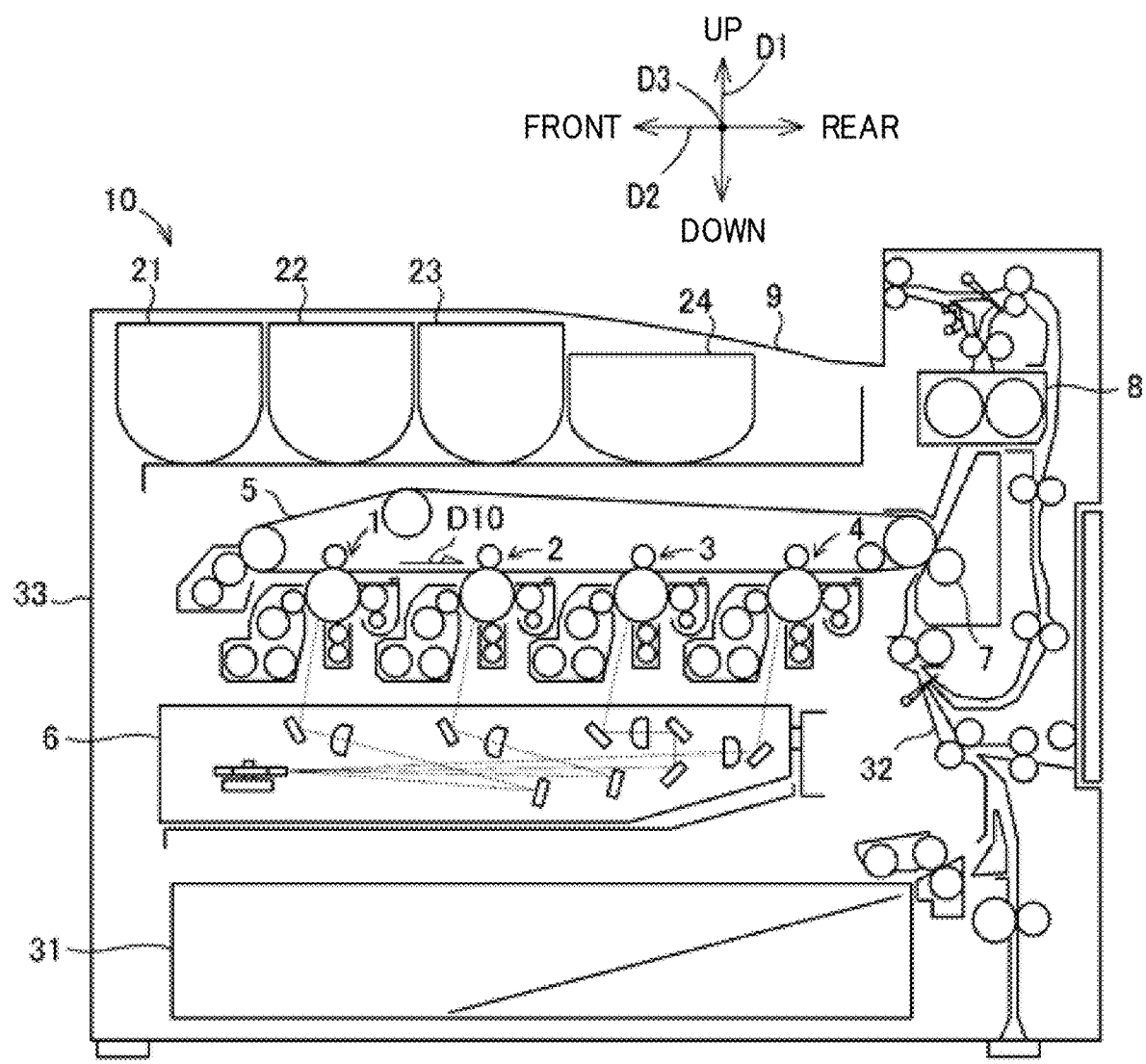
FIG. 1 is a diagram showing a configuration of an image forming apparatus according to an embodiment of the present disclosure.

FIG. 1 is a diagram showing a configuration of the image forming apparatus 10 according to an embodiment of the present disclosure. As shown in FIG. 1, the image forming apparatus 10 includes a plurality of image forming units 1-4, an intermediate transfer belt 5, a laser scanning unit 6, a secondary transfer roller 7, a fixing device 8, a sheet discharge tray 9, toner containers 21-24, a sheet feed cassette 31, a conveyance path 32, and a housing 33 storing these components. The image forming apparatus 10 is a color printer configured to form a color or monochrome image on a sheet supplied from the sheet feed cassette 31 along the conveyance path 32, based on image data input from an information processing apparatus such as a personal computer. It is noted that the image forming apparatus 10 only needs to be an apparatus having a print function, and may be, for example, a copier or a facsimile apparatus.

The image forming units 1-4 are arranged in alignment in a running direction D10 in which the intermediate transfer belt 5 runs, and constitute an image forming portion of what is called a tandem system. Specifically, the image forming unit 1 forms a yellow toner image, the image forming unit 2 forms a magenta toner image, the image forming unit 3 forms a cyan toner image, and the image forming unit 4 forms a black toner image.

Figure 2:
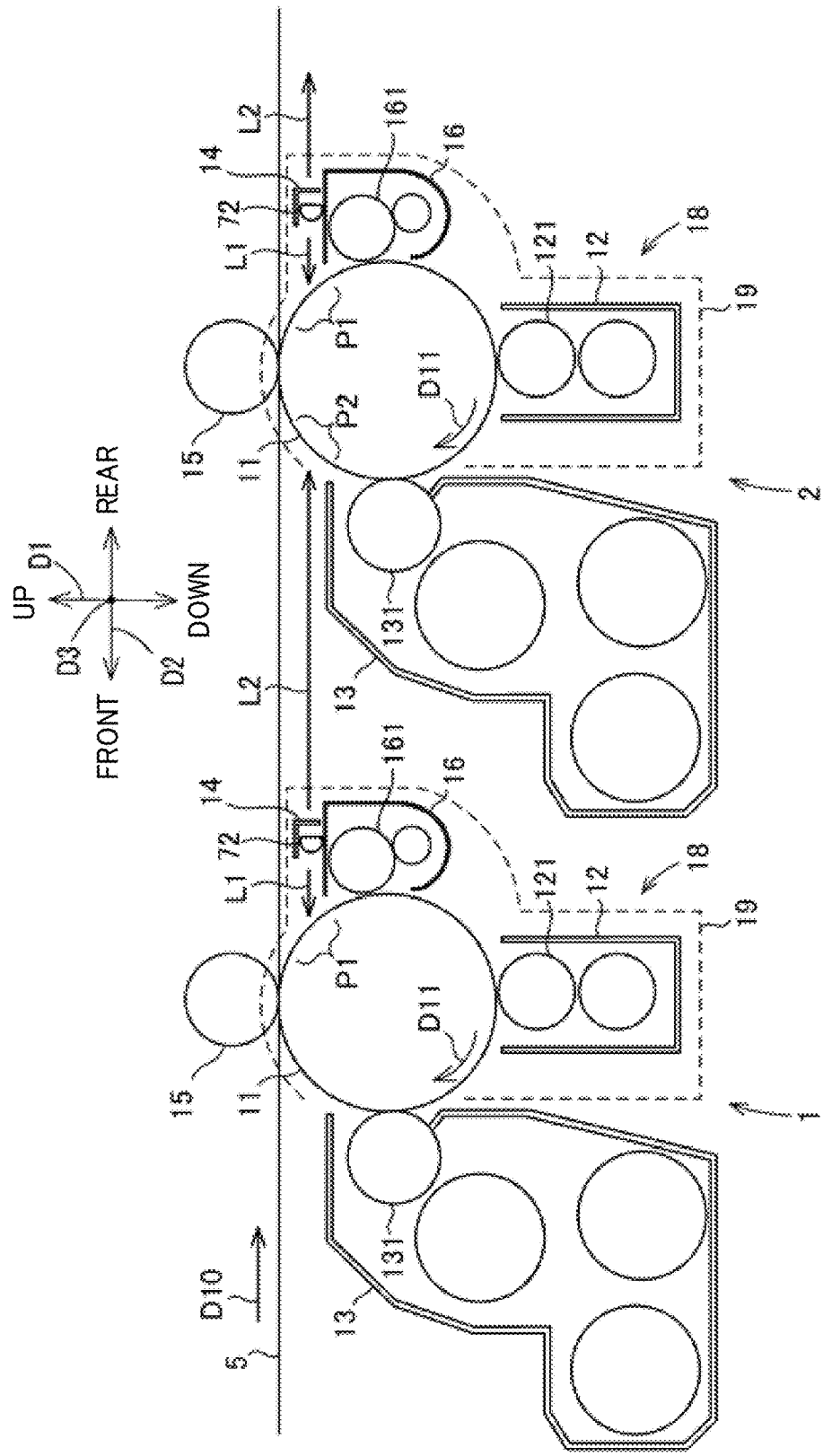
FIG. 2 is a diagram showing an example of image forming units of the image forming apparatus.

FIG. 2 is a schematic diagram showing a configuration of the image forming units 1 and 2. As shown in FIG. 2, each of the image forming units 1 and 2 includes a drum unit 18, a developing portion 13, and a primary transfer roller 15. In addition, the drum unit 18 includes a photoconductor drum 11, a charging portion 12, a charge removing portion 14 (an example of a light guide device of the present disclosure), and a cleaning portion 16. Each of the image forming units 1 and 2 forms a toner image on the photoconductor drum 11 by an electrophotographic method, and transfers the toner image to the intermediate transfer belt 5. It is noted that description of the image forming units 3 and 4 is omitted here since they have the same configuration as the image forming units 1 and 2.

The drum unit 18 is attached to the image forming apparatus 10 in a detachable manner. In the present embodiment, the drum unit 18 is attached to the housing 33 by being inserted from the right side surface of the image forming apparatus 10 toward the depth side (left side) of the housing 33. The drum unit 18 further includes a housing 19 that stores the photoconductor drum 11, the charging portion 12, the charge removing portion 14, and the cleaning portion 16. The photoconductor drum 11 is rotatably supported by the housing 19.

The four photoconductor drums 11 are arranged in alignment in the running direction D10 in which the intermediate transfer belt 5 runs. Each of the photoconductor drums 11 is an image carrier that carries an electrostatic latent image and a toner image. The charging portion 12 is provided in a lower portion of the housing 19, and includes a charging roller 121 that electrically charges the photoconductor drum 11 by electric power supplied from a power supply (not shown). The laser scanning unit 6 irradiates a laser light to the photoconductor drum 11 that has been electrically charged by the charging portion 12, so that an electrostatic latent image is formed on an outer peripheral surface of the photoconductor drum 11 based on the image data. Each of the plurality of developing portions 13 includes a developing roller 131 that develops the electrostatic latent image formed on the photoconductor drum 11 with toner (developer). The developing portions 13 receive toner of respective colors supplied from the toner containers 21-24.

The primary transfer rollers 15 transfer toner images formed on the photoconductor drums 11 to the intermediate transfer belt 5. The intermediate transfer belt 5 is an intermediate transfer member that runs above the photoconductor drums 11 of the image forming units 1 and 2, wherein toner images of respective colors formed on the photoconductor drums 11 are overlaid in sequence and transferred thereto. The secondary transfer roller 7 transfers the toner image on the intermediate transfer belt 5 to a sheet conveyed along the conveyance path 32. Thereafter, the toner image transferred to the sheet is heated by the fixing device 8 to be fixed to the sheet. Each of the cleaning portions 16 includes a cleaning roller 161 that cleans the photoconductor drum 11 after transfer of the toner image.

Each of the charge removing portion 14 irradiates a charge removing light L1 for removing the charge on the photoconductor drum 11, to a region P1 on the outer peripheral surface of the photoconductor drum 11, the region P1 located between the primary transfer roller 15 and the cleaning roller 161. In other words, each of the charge removing portion 14 irradiates the charge removing light L1 to the region P1 on the surface of the photoconductor drum 11, the region P1 located downstream of the primary transfer roller 15 and upstream of the cleaning roller 161 in a rotation direction D11.

In addition, each of the charge removing portion 14 irradiates a charge removing light L2 for removing the charge on the photoconductor drum 11 to the outer peripheral surface of the photoconductor drum 11 of another image forming unit located downstream in the running direction D10. For example, the charge removing portion 14 of the image forming unit 1 irradiates the charge removing light L2 to a region P2 on the surface of the photoconductor drum 11 of the image forming unit 2 located downstream, the region P2 located between the developing roller 131 and the primary transfer roller 15. In other words, each of the charge removing portion 14 irradiates the charge removing light L2 to the region P2 on the surface of another photoconductor drum 11 located downstream, the region P2 located downstream of the developing roller 131 and upstream of the primary transfer roller 15 in the rotation direction D11.

As described above, with the charge removing lights L1 and L2 irradiated to the regions P1 and P2 on the photoconductor drums 11, the charges on the photoconductor drums 11 are removed at around the time when the toner images are transferred from the photoconductor drums 11 to the intermediate transfer belt 5. As a result, an occurrence of what is called a memory image on the surface of each photoconductor drum 11 is restricted.

It is noted that since the yellow image is not noticeable, if the charge removing light L2 is not irradiated to the photoconductor drum 11 of the image forming unit 1 for yellow, the problem of the image memory hardly occurs. For this reason, the image forming apparatus 10 is configured such that the charge removing light L2 is not irradiated to the photoconductor drum 11 of the image forming unit 1. Of course, the image forming apparatus 10 may be configured such that the charge removing light L2 is irradiated to the photoconductor drum 11 of the image forming unit 1.

Figure 3:
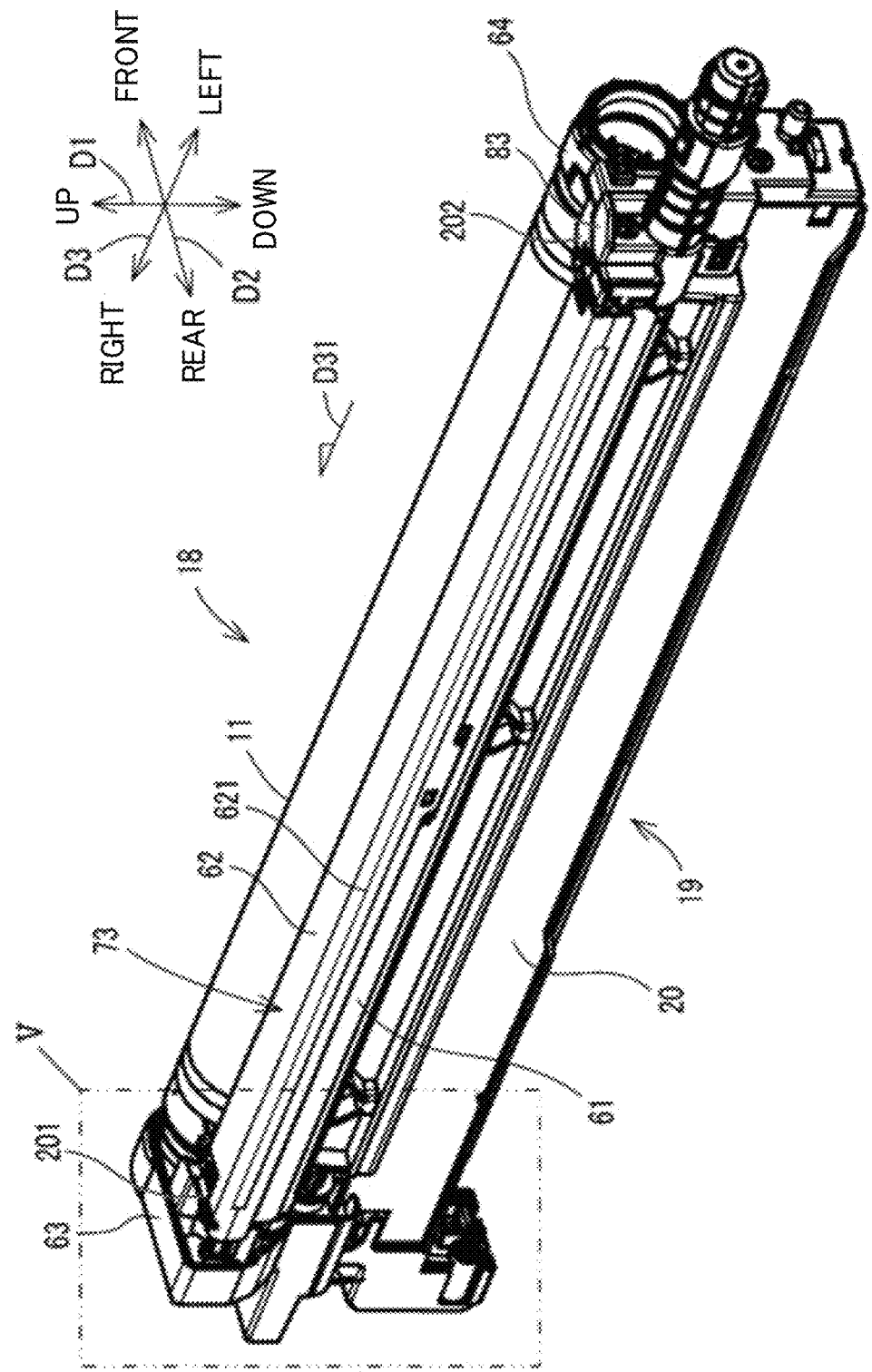
FIG. 3 is a perspective diagram of a drum unit of an image forming unit.
Figure 4:
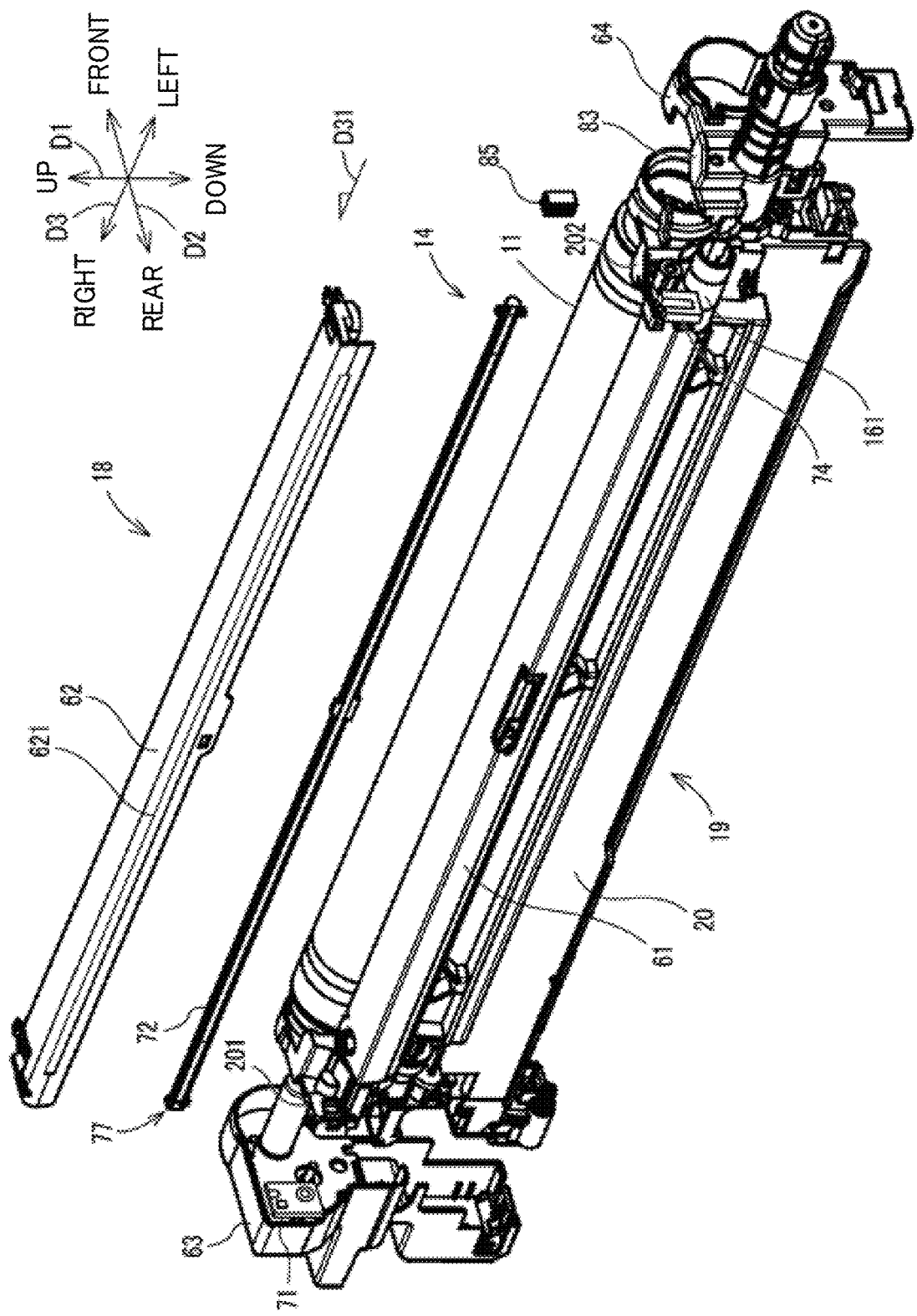
FIG. 4 is an exploded perspective diagram of the drum unit.

As described above, the image forming apparatus 10 includes the drum units 18. Each of the drum units 18 is configured to rotatably support the photoconductor drum 11, and, as shown in FIG. 3 and FIG. 4, is formed to be elongated in the left-right direction D3. The drum unit 18 is attached to an inner frame of the housing 33 or the like in a state where the longitudinal direction thereof matches the left-right direction D3.

FIG. 3 is a perspective diagram of the drum unit 18. FIG. 4 is an exploded perspective diagram of the drum unit 18. As shown in FIG. 3 and FIG. 4, the housing 19 of the drum unit 18 includes a housing main body 20, a pair of side plates 201 and 202, and a pair of support members 63 and 64.

The pair of side plates 201 and 202 are respectively provided at opposite end portions of the housing main body 20 opposite in its longitudinal direction. The pair of side plates 201 and 202 are formed integrally with the housing main body 20. The side plate 201 is provided at a right side of the housing main body 20, and the side plate 202 is provided at a left side of the housing main body 20.

The pair of support members 63 and 64 are respectively provided at opposite end portions of the housing main body 20 opposite in its longitudinal direction. The support member 63 is attached to an outside (right) side surface of the side plate 201 of the housing main body 20. The support member 63 is an example of a side member of the present disclosure and attached in such a way as to cover a side of the side plate 201. In addition, the support member 64 is attached to an outside (left) side surface of the side plate 202 of the housing main body 20. In a state where the support members 63 and 64 are attached to the housing main body 20, opposite end portions of the photoconductor drum 11 are rotatably supported by the support members 63 and 64. In addition, the charging roller 121 and the cleaning roller 161 (see FIG. 2) are rotatably supported by the housing 19, too. In the present embodiment, the photoconductor drum 11, the charging portion 12, the cleaning portion 16 and the like are attached to the housing 19, thereby unitizing the drum unit 18.

In addition, the housing 19 includes a side frame 61 and a cover member 62. The side frame 61 is an elongated member covering a peripheral surface of the photoconductor drum 11 on the rear side. The side frame 61 extends along the left-right direction D3 to bridge between the side plate 201 and the side plate 202. The cleaning portion 16 is provided inside the side frame 61.

The housing 19 includes a storage portion 73 (see FIG. 3) at the rear side of the photoconductor drum 11. The storage portion 73 is configured to store a light guide member 72 (see FIG. 4) that is described below, and is composed of the side frame 61 and the cover member 62. Specifically, the upper surface of the side frame 61 is a flat surface extending in the left-right direction D3. The cover member 62 is a plate-like member elongated in the left-right direction D3, and is provided above the side frame 61 in such a way as to cover the upper surface of the side frame 61. With the configuration where the cover member 62 is provided above the side frame 61, the storage portion 73 is formed between the side frame 61 and the cover member 62 such that the light guide member 72 described below is stored in the storage portion 73.

The charge removing portion 14 is provided in the housing 19 of the drum unit 18. The charge removing portion 14 is configured to, as described above, irradiate the charge removing lights L1 and L2 (see FIG. 2) to the surfaces of the photoconductor drums 11, and is an example of a light guide device of the present disclosure.

As shown in FIG. 4, the charge removing portion 14 includes a light source substrate 71, the light guide member 72 (an example of a light guide body of the present disclosure), and a holding member 74 (a cleaning member).

The light guide member 72 is supported by the housing 19. Specifically, the light guide member 72 is attached to the inside of the storage portion 73. The light guide member 72 is formed to be elongated in the longitudinal direction of the drum unit 18 (the left-right direction D3). The light guide member 72 is formed from, for example, transparent acrylic resin in a shape of a bar. The light guide member 72 is formed to be longer than the photoconductor drum 11 and is disposed such that its longitudinal direction is parallel to the axial direction of the photoconductor drum 11.

The holding member 74 holds an end portion of one side (the left side) of the light guide member 72. The holding member 74 is attached to an outside (left) side surface of the side plate 202. The side plate 202 has an insertion hole through which the light guide member 72 is stored in the storage portion 73. When the light guide member 72 is inserted in the storage portion 73 through the insertion hole, the left end portion of the light guide member 72 is supported by the holding member 74.

The side plate 201 has a holding hole 201A (see FIG. 6) configured to hold a right end portion 721 (see FIG. 6) of the light guide member 72 inserted in the storage portion 73, the right end portion 721 located at the other side (right side) of the light guide member 72. In a state where the right end portion 721 of the light guide member 72 is inserted through the holding hole 201A, the right end portion 721 of the light guide member 72 is supported by the holding hole 201A.

The light guide member 72 includes a flat, incident surface 77 (an example of a light incident surface of the present disclosure) on the right end portion 721 at one side (the right side) in the longitudinal direction. The light from the light source substrate 71 enters the incident surface 77. In addition, the light guide member 72 includes two light exit surfaces (not shown) that emit light in directions that cross the longitudinal direction. The light guide member 72 is formed to be semicircular in cross section. The light exit surfaces are respectively formed on two side surfaces of the light guide member 72 that are opposite to each other in a horizontal direction (the front-rear direction D2) crossing the longitudinal direction.

In the present embodiment, the light exit surface (hereinafter, also referred to as a first light exit surface) provided at the front side of the light guide member 72 is an arc, curved surface (arc surface) that extends along the longitudinal direction. In addition, the light exit surface (hereinafter, also referred to as a second light exit surface) provided at the rear side of the light guide member 72 is a flat surface extending along the longitudinal direction. The light guide member 72 is disposed such that the first light exit surface is directed toward the region P1 on the surface of the photoconductor drum 11 of the drum unit 18 at the front side thereof, and the second light exit surface is directed toward the region P2 on the surface of the photoconductor drum 11 of another drum unit 18 adjacent on the rear side. In other words, the light guide member 72 is disposed such that the first light exit surface is directed frontward, and the second light exit surface is directed rearward.

A plurality of transmission reflection portions (not shown) are formed inside the light guide member 72. The transmission reflection portions are grooves of a triangular shape in cross section, formed at the second light exit surface at predetermined intervals along the longitudinal direction. The light that has entered the incident surface 77 goes inside the light guide member 72 and enters the transmission reflection portions. A part of the incident light is reflected on the transmission reflection portions and is emitted frontward, as the charge removing light L1 (see FIG. 2), from the first light exit surface opposite to the transmission reflection portions. The charge removing light L1 is irradiated to the region P1 (see FIG. 2). In addition, the light that goes inside the light guide member 72 enters the transmission reflection portions, and another part of the incident light is reflected on the transmission reflection portions and is emitted rearward, as the charge removing light L2 (see FIG. 2), from the second light exit surface. The charge removing light L2 is irradiated to the region P2 (see FIG. 2).

It is noted that a through window 621 is formed in a rear side surface of the cover member 62, wherein the through window 621 is elongated in the longitudinal direction. The charge removing light L2 emitted from the second light exit surface passes through the through window 621 to be irradiated to the region P2.

As shown in FIG. 4, the light source substrate 71 is attached to an inner surface of the support member 63. Specifically, the light source substrate 71 is attached to an upper part of the inner surface. The light source substrate 71 includes a light element 711 (see FIG. 7) that emits light for removing the charge from the photoconductor drum 11. The light element 711 emits light toward the incident surface 77 of the light guide member 72. The light source substrate 71 is, for example, a LED light source in which the light element 711 such as a LED element is mounted on a mounting surface of a rectangular substrate 712 (see FIG. 7). The light source substrate 71 is disposed between a right end portion of the storage portion 73 (see FIG. 3) and the support member 63. The light source substrate 71 is disposed such that the light element 711 faces the incident surface 77. The light emitted from the light element 711 of the light source substrate 71 enters the incident surface 77 (see FIG. 4) disposed at one side of the light guide member 72 in the longitudinal direction. The light that has entered the incident surface 77 goes toward the other side in the longitudinal direction, reflects on the transmission reflection portions, and is emitted from the first light exit surface and the second light exit surface.

Figure 5:
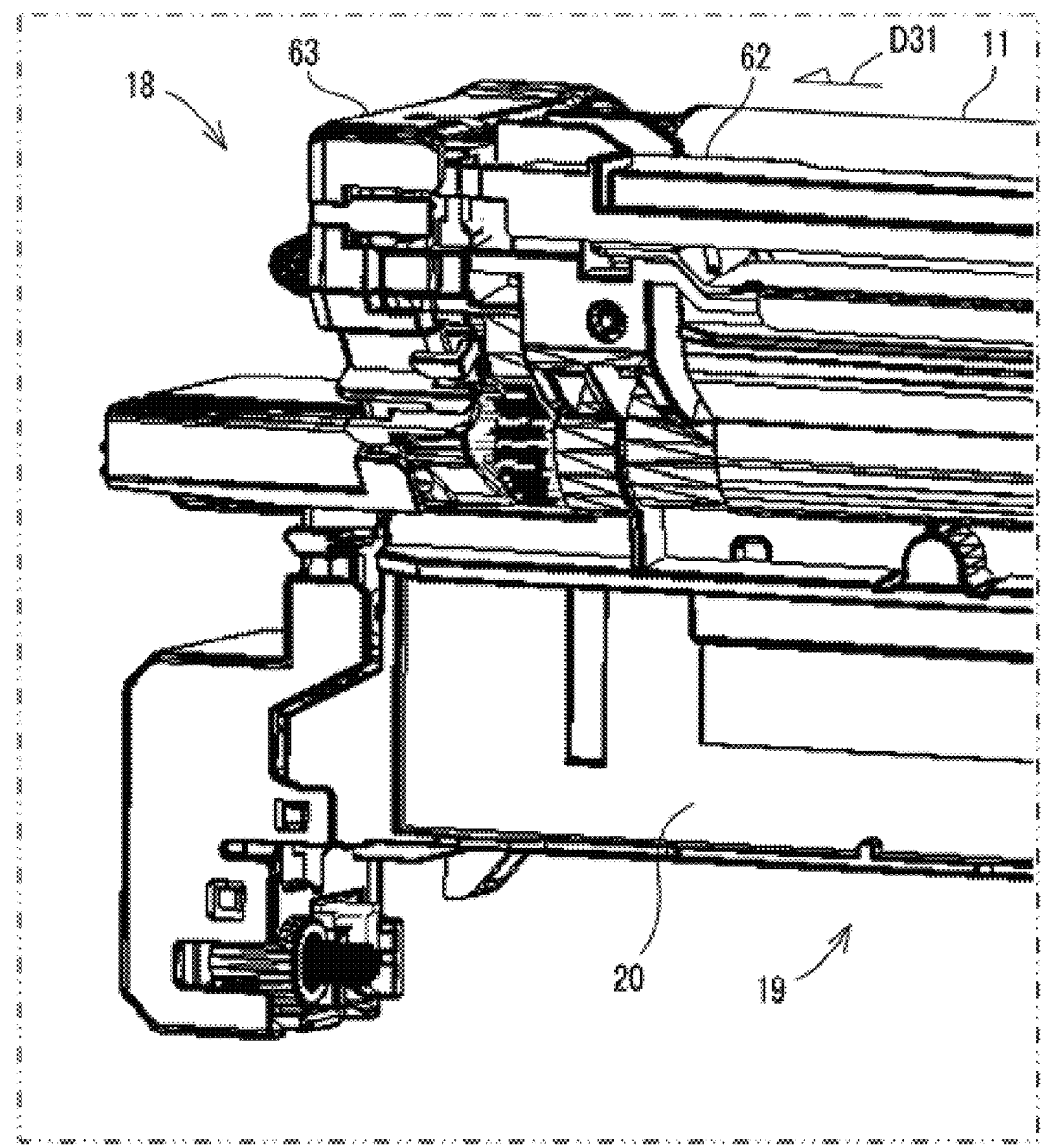
FIG. 5 is a partially enlarged diagram of a main part V indicated in FIG. 3.
Figure 6:
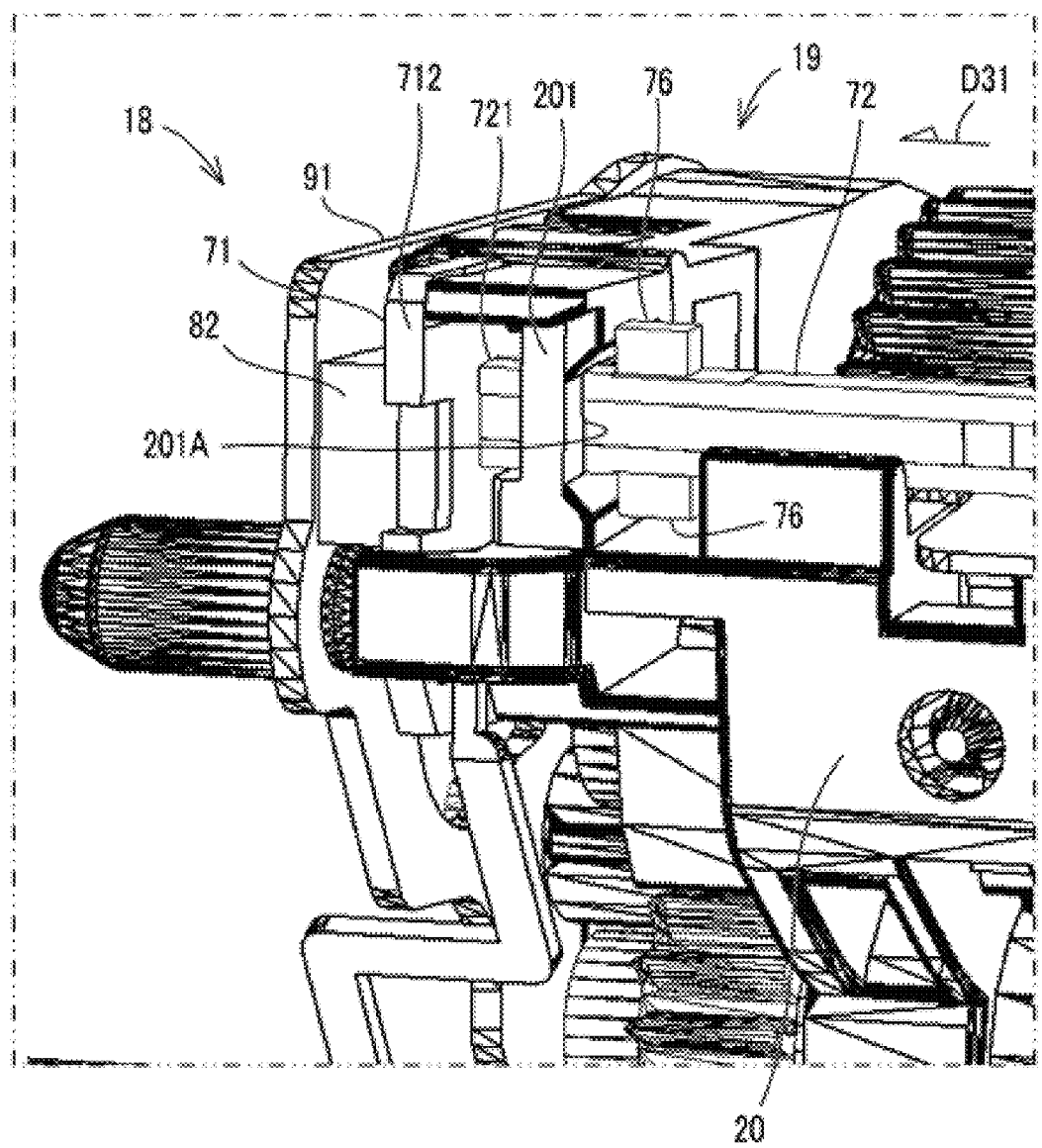
FIG. 6 is a diagram showing an internal structure of a right end portion of the drum unit.
Figure 7:
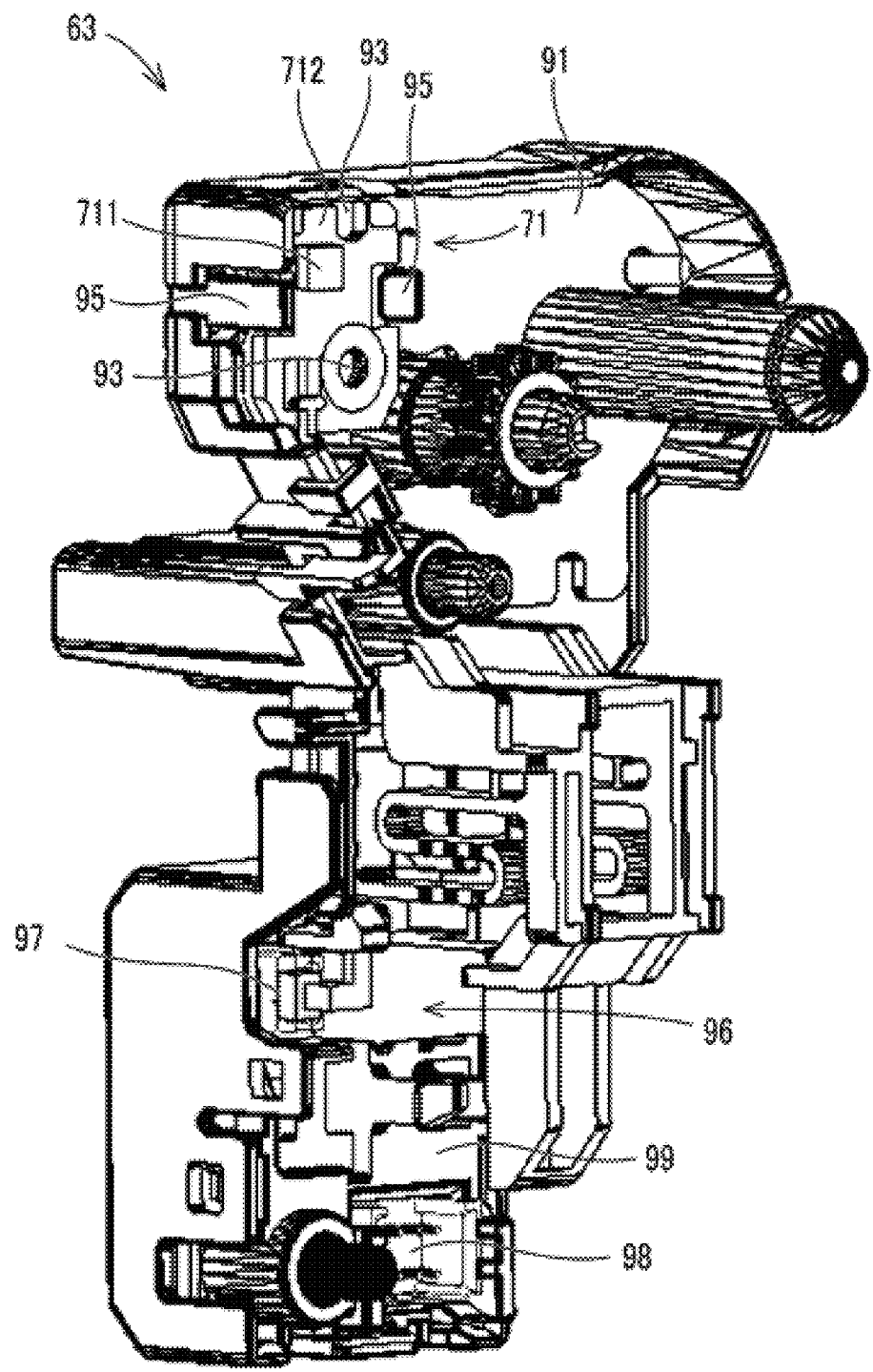
FIG. 7 is a perspective diagram of a support member provided at a right side of the drum unit.
Figure 8:
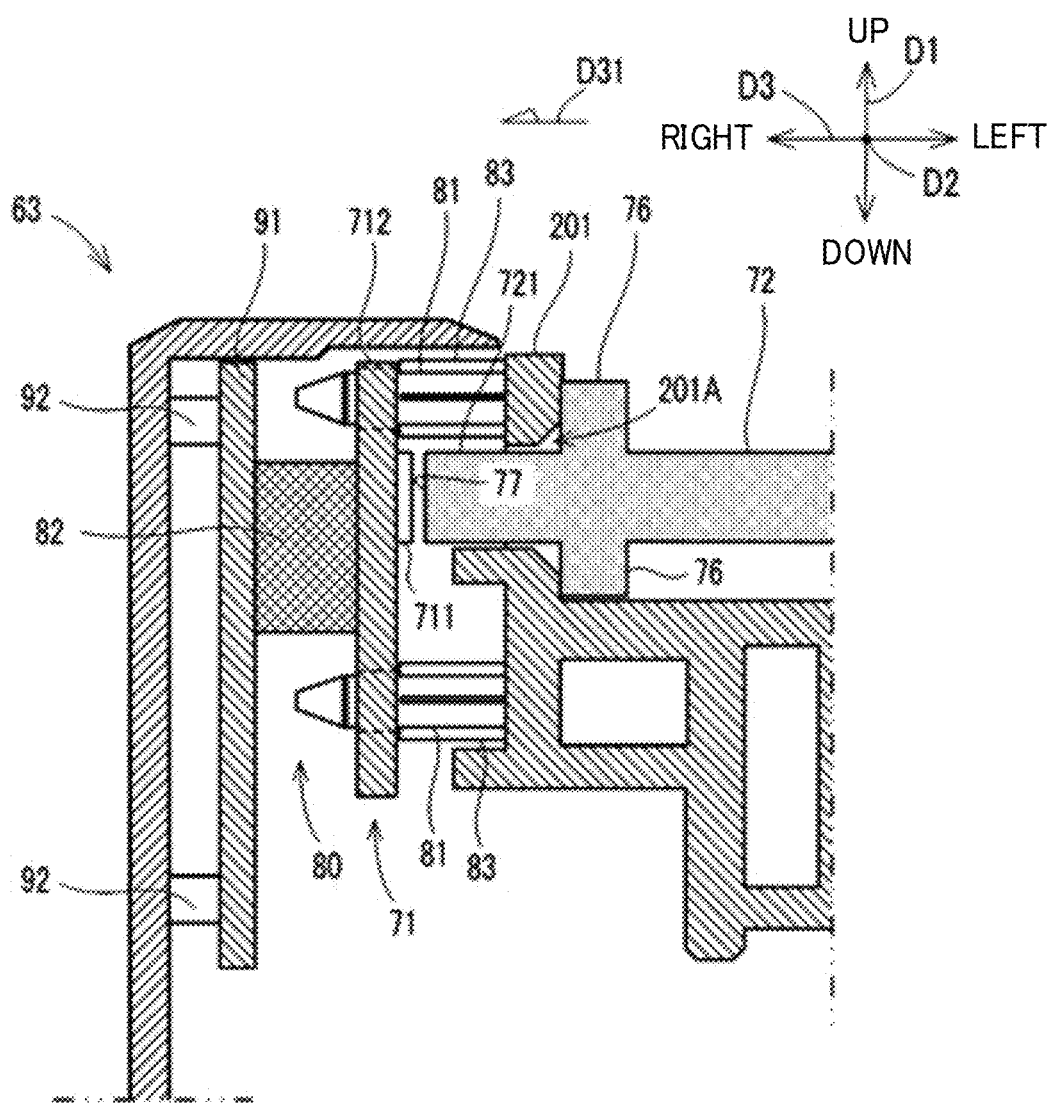
FIG. 8 is a schematic cross-sectional diagram showing a peripheral configuration of a right end portion of a light guide member and a light source substrate.

FIG. 5 is a partially enlarged diagram of a main part V indicated in FIG. 3, and shows a right end portion of the drum unit 18. FIG. 6 is a diagram showing an internal structure of the right end portion of the drum unit 18. FIG. 7 is a perspective diagram of the support member 63, and shows an inner configuration of the support member 63. FIG. 8 is a schematic cross-sectional diagram showing a peripheral configuration of the right end portion 721 of the light guide member 72 and the light source substrate 71. In FIG. 6, the support member 63 and the cover member 62 are omitted.

As shown in FIG. 6, a pair of projections 76 are provided in the vicinity of the right end portion 721 of the light guide member 72, wherein the pair of projections 76 project in the up-down direction D1 and have a role of a stopper. One of the pair of projections 76 projects upward from the upper end portion of the light guide member 72, and the other of the pair of projections 76 projects downward from the lower end portion of the light guide member 72.

The light guide member 72 is inserted from the insertion hole formed in the side plate 202, and the light guide member 72 is pressed in rightward in an insertion direction D31. In this way, the light guide member 72 is stored in the storage portion 73 through the insertion hole. In addition, when the right end portion 721 of the light guide member 72 is inserted in the holding hole 201A of the side plate 201, and the light guide member 72 is further pressed in, the projections 76 abut on the peripheral edge of the holding hole 201A. This causes the incident surface 77 of the right end portion 721 of the light guide member 72 to be positioned to a predetermined restriction position. That is, the projections 76 and the peripheral edge of the holding hole 201A restrict the light guide member 72 from being displaced from the regulating position rightward.

Meanwhile, in the charge removing portion 14, the positioning accuracy of positioning the light element 711 of the light source substrate 71 and the incident surface 77 of the light guide member 72 is important in stabilizing the intensity of the charge removing light irradiated on the surface of the photoconductor drum 11. When the positioning accuracy is low, the intensity of the charge removing light is varied. In addition, even when the light element 711 and the incident surface 77 of the light guide member 72 are positioned appropriately, if the light source substrate 71, the light guide member 72, and a support member supporting these are assembled with low assembly accuracy, the intensity of the charge removing light may be varied. In addition, according to a conventional method of assembling a plurality of members such as the light source substrate 71, the light guide member 72, and other members, tolerances of the members may accumulate and the assembly accuracy may be lowered due to the cumulative tolerance. On the other hand, in the present embodiment, since a positioning mechanism 80 (an example of a positioning portion of the present disclosure) that is described below is provided, it is possible to improve the positioning accuracy of positioning the light element 711 of the light source substrate 71 and the incident surface 77 of the light guide member 72, and improve the assembly accuracy of assembling a plurality of members including the light source substrate 71 and the light guide member 72.

The positioning mechanism 80 is provided in the housing 19. The positioning mechanism 80 is configured to position the light element 711 of the light source substrate 71 to a predetermined reference position with respect to the incident surface 77 of the light guide member 72. The reference position is defined to be a position where a gap between the incident surface 77 positioned to the restriction position and the light element 711 is a reference value (reference interval).

As shown in FIG. 8, the positioning mechanism 80 includes abutting pins 81 (an example of an abutting member of the present disclosure) and an elastic member 82 (an example of an elastic member of the present disclosure).

The abutting pins 81 are configured to abut on the mounting surface in the light source substrate 71 on which the light element 711 is mounted. The abutting pins 81 are formed to stand on a right side surface of the side plate 201. Two abutting pins 81 are provided on the side plate 201. The abutting pins 81 are separated from each other in the up-down direction D1, and project rightward from the right side surface of the side plate 201 in a direction perpendicular to the surface. At least one rib 83 is provided on the outer peripheral surface of the abutting pin 81 to extend in the projection direction of the abutting pin 81.

A holding plate 91 made from a sheet metal is fixed to the inner side surface of the support member 63 via bosses 92. The holding plate 91 is fixed to the bosses 92 by screws or the like. As shown in FIG. 6 and FIG. 8, the elastic member 82 is attached to a surface of the holding plate 91. The elastic member 82 is made from, for example, silicone rubber, a sponge member, or a spring. The elastic member 82 contracts and elastically presses the light source substrate 71 toward the incident surface 77 of the light guide member 72 (leftward) in a state where the support member 63 is attached to the side plate 201. In the present embodiment, the elastic member 82 is a sponge member formed in a rectangular parallelepiped shape. One side surface (right surface) of the elastic member 82 is fixed to the surface of the holding plate 91 by a bonding material such as double-sided tape. The other side surface (left surface) of the elastic member 82 is fixed to the substrate 712 of the light source substrate 71 by a bonding material such as double-sided tape.

In addition, as shown in FIG. 7, the support member 63 is provided with two support arms 95, wherein hooks are formed at tips of the support arms 95. The support arms 95 are formed to project from the inner side surface of the support member 63 in a direction perpendicular to the inner side surface, and the hooks at the tips of the support arms 95 are engaged with an edge of the substrate 712 of the light source substrate 71. This allows the light source substrate 71 to be displaced within a range of the contract of the elastic member 82 in a direction perpendicular to the inner side surface (contract direction of the elastic member 82).

As shown in FIG. 7, two engaging holes 93 are formed in the substrate 712. The engaging holes 93 are provided at positions corresponding to the abutting pins 81 and separated from each other in the up-down direction D1 in the substrate 712. In a state where the support member 63 is attached to the side plate 201, tip end portions of the abutting pins 81 are inserted in the corresponding engaging holes 93. Subsequently, when the support member 63 is attached and fixed to the side plate 201, the elastic member 82 presses the substrate 712 leftward. At this time, the ribs 83 of the abutting pins 81 abut on the edges of the engaging holes 93, thereby the elastic member 82 receives a pressing force from the abutting pins 81 and contracts, and the light source substrate 71 is pressed toward the light guide member 72 (leftward) by an elastic force generated by the contract of the elastic member 82. This positions the light element 711 of the light source substrate 71 to the reference position. With such a positioning, it is possible to improve the positioning accuracy of positioning the light element 711 of the light source substrate 71 attached to the support member 63, and the incident surface 77 of the light guide member 72 supported by the storage portion 73 of the housing 19.

As shown in FIG. 7, in the present embodiment, a connector substrate 96 is attached to the inner side surface of the support member 63, wherein connector members 97 and 98 are mounted on the connector substrate 96. The connector members 97 and 98 are configured to relay electric power that is applied to the light element 711 of the light source substrate 71, and both are mounted on a substrate 99. The connector substrate 96 is provided at a lower part of the inner side surface of the support member 63. In the present embodiment, the assembling direction in which the light source substrate 71 and the connector substrate 96 are assembled with the support member 63 matches the attachment direction in which the support member 63 is attached to the side plate 201 of the housing 19. That is, both the light source substrate 71 and the connector substrate 96 are assembled along a direction perpendicular to the inner side surface of the support member 63 (along the left-right direction D3). With this configuration, since the assembling directions in which the members are assembled with the support member 63 are unified, the assembling is easy, and it is possible to improve the assembly accuracy of the light source substrate 71, the connector substrate 96, and other members after assembling.

It is noted that although the above-described embodiment shows a configuration where the light source substrate 71, the light guide member 72, and the positioning mechanism 80 are provided in the drum unit 18, the present disclosure is not limited to this configuration. For example, the present disclosure may be regarded as a light guide device that is provided independently of the drum unit 18 and includes the light source substrate 71, the light guide member 72, and the positioning mechanism 80. In addition, the present disclosure may be regarded as a light guide device that, in a scan unit of an image reading device that reads an image from an irradiation target object such as a document sheet based on light reflected from the document sheet, irradiates light and guides the light to the document sheet, or may be regarded as an image reading device including the light guide device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A light guide device comprising:
a housing main body;
a pair of side plates provided at both longitudinal ends of the housing main body;
a side member attached to an outer surface of a side plate on one longitudinal side among the pair of side plates;
a light guide body supported at both longitudinal ends by the pair of side plates and including a light incident surface to which light enters;
a projection provided on one longitudinal side of the light guide body and extending in a direction orthogonal to a longitudinal direction of the light guide body;
a holding hole provided in the side plate on one longitudinal side, wherein one of the longitudinal ends of the light guide body is inserted in the holding hole and the projection abuts on a peripheral edge of the holding hole;
a light source substrate held between the side member and the side plate on one longitudinal side and including a light element that emits the light toward the light incident surface; and
a positioning portion configured to position the light element to a reference position with respect to the light incident surface, wherein
the positioning portion includes:
an abutting member formed to stand on the outer surface of the side plate on one longitudinal side and including a tip end portion inserted in an engaging hole formed in the light source substrate;
a rib provided on an outer peripheral surface of the abutting member and extending in a standing direction of the abutting member; and
an elastic member held by the side member and configured to elastically press the light source substrate toward the light guide body to have the rib abut on a peripheral edge of the engaging hole so as to position the light element to the reference position.

2. The light guide device according to claim 1, wherein the elastic member is configured to contract upon receiving a pressing force when the rib of the abutting member abuts on the peripheral edge of the engaging hole, and the light source substrate is supported by the side member in such a way as to be displaceable in a direction in which the elastic member contracts.

3. The light guide device according to claim 1, further comprising:
- a connector member held by the side member and configured to apply electric power to the light element, wherein
- an assembling direction in which the light source substrate and the connector member are assembled with the side member matches an attachment direction in which the side member is attached to the housing main body.

4. A drum unit that is attached to an image forming apparatus for use, the drum unit comprising:
- a housing main body supporting a photoconductor drum rotatably;
- a pair of side plates provided at both longitudinal ends of the housing main body;
- a side member attached to an outer surface of a side plate on one longitudinal side among the pair of side plates;
- a light guide body supported at both longitudinal ends by the pair of side plates, including a light incident surface and a light exit surface, wherein light enters the light incident surface, the light exit surface emits light in a direction that crosses a direction in which the light enters the light incident surface, and the light guide body irradiates a charge removing light from the light exit surface toward the photoconductor drum;
- a projection provided on one longitudinal side of the light guide body and extending in a direction orthogonal to a longitudinal direction of the light guide body;
- a holding hole provided in the side plate on one longitudinal side, wherein one of the longitudinal ends of the light guide body is inserted in the holding hole;
- a light source substrate held between the side member and the side plate on one longitudinal side and including a light element that emits the light toward the light incident surface; and
- a positioning portion configured to position the light element to a reference position with respect to the light incident surface, wherein the positioning portion includes:
- an abutting member formed to stand on the outer surface of the side plate on one longitudinal side and including a tip end portion inserted in an engaging hole formed in the light source substrate;
- a rib provided on an outer peripheral surface of the abutting member and extending in a standing direction of the abutting member; and
- an elastic member held by the side member and configured to elastically press the light source substrate toward the light guide body to have the rib abut on a peripheral edge of the engaging hole so as to position the light element to the reference position.

5. An image forming apparatus that comprises the drum unit according to claim 4 and forms a toner image on the photoconductor drum.

6. An image forming apparatus comprising:
- the light guide device according to claim 1; and
- a photoconductor drum to which light guided by the light guide device is irradiated.

7. An image reading device comprising:
- the light guide device according to claim 1; and
- an irradiation target object to which light guided by the light guide device is irradiated, wherein
- the image reading device reads image data from a surface of the irradiation target object to which the light is irradiated, based on light reflected from the irradiation target object.

* * * * *